INVENTORS
Theodore S. Sprague
John Schlichting
Johannes H. Ammon

ATTORNEY

United States Patent Office 3,437,077
Patented Apr. 8, 1969

3,437,077
ONCE-THROUGH VAPOR GENERATOR
Johannes H. Ammon, Akron, John Schlichting, Hudson, and Theodore S. Sprague, Akron, Ohio, assignors to The Babcock & Wilcox Company, New York, N.Y., a corporation of New Jersey
Filed Jan. 21, 1966, Ser. No. 522,128
Int. Cl. F22b 1/02
U.S. Cl. 122—32                                    25 Claims

ABSTRACT OF THE DISCLOSURE

A once-through vapor generator comprising an upright vessel divided by a tube sheet into a vapor generating chamber and a second chamber containing primary fluid inflow and outflow compartments. The vapor generating chamber is occupied by an annular bank of equidistantly spaced U-bend tubes connected to the tube sheet and opening to the primary fluid fluid inflow and outflow compartments. Each tube has upright first and second sections, the first sections being located centrally within the annular bank, the second sections being arranged concentrically about the first sections. Provisions are made for successively vaporizing and superheating secondary fluid by passing it through the vapor generating chamber and over the tubes in indirect heat absorbing relation with the primary fluid.

---

This invention relates in general to once-through vapor generators and more particularly to such units operating at relatively low mass flows and especially adapted for use where reduced headroom is a necessary element of the design.

Mass flow is defined as the quantity of fluid passing through a specific planar area per unit of time. It was long believed that high mass flow rates were required in once-through vapor generators to maintain nucleate boiling characteristics over the extreme range of absorption rates to which the boiling fluid is subjected and to improve the film heat transfer coefficient characteristics both at and above the point of departure from nucleate boiling.

The point of departure from nucleate boiling, DNB, in a once-through vapor generator is particularly significant since it provides a sharp distinction between the relatively high heat transfer rates usually associated with nucleate boiling and the relatively low heat transfer rates which distinguishes the film boiling condition. Nucleate boiling is characterized by the formation on and rapid release of vapor bubbles from the heat emitting face of the heat transfer surface with sufficient residual liquid to still wet the fluid-heating surface interface, while in film boiling the interface has interposed therebetween a high resistance vapor film. Since the temperature gradient relates the temperature of the heat emitting face and the liquid absorber, for a given set of operating conditions the magnitude of this gradient depends mainly on whether nucleate or film boiling heat transfer is taking place.

In nucleate boiling the vapor bubbles generated at nucleation points or sites on the heat transfer surface rapidly detach themselves and move into the bulk liquid, the resulting agitation of the mixture producing an excellent heat transfer coefficient. In film boiling a shielding film of vapor forms upon the heat transfer surface so that generation of steam by the heated fluid does not occur at the heat transfer surface boundary but rather at the liquid-vapor film interface. The vapor film prevents the liquid from wetting the boundary surface with consequent drastic reduction in the value of the heat transfer coefficient. In effect the vapor film serves as a layer of insulation which effectively retards the rate at which heat is transferred from the heat emitting surface to the absorbing liquid, and the temperature of the heat emitting surface is thus maintained at an appreciable higher level than that resulting with nucleate boiling for the same pressure, heat flux and mass flow conditions. It will be appreciated that while the danger of burnout due to high heat flux is essentially nonexistent in the nucleate boiling region there may be a serious problem of tube burnout associated with film boiling, depending on the heat flux and mass flow prevailing within the heat transfer region.

To obtain satisfactory operating conditions and acceptable service life in a vapor generator, for example a once-through type unit, it is necessary to maintain nucleate boiling heat transfer to as high an upper limit of steam quality as possible. The optimum condition would be to maintain nucleate boiling during vapor generation from zero to 100 percent quality. However, achieving such range is not always possible. In the past it was the general belief that once-through boiler operation had to be carried out in a relatively high range of mass flow, that is above 600,000 lbs./hr./ft.² It had appeared that as mass flow dropped off the DNB quality limit would also continue to decrease. However, more recent research has indicated that a point exists where the DNB quality starts to increase with a further decrease in the mass flow. As a matter of fact, it appears that the DNB quality approaches 100 percent for extremely low values of mass flow.

Design of a once-through vapor generator is dependent upon a number of factors such as velocity, mass flow, heat flux, pressure and geometry or physical arrangement of the boiler. Previously it was assumed that high mass flows were necessary for once-through vapor generators to maintain the necessary high DNB quality limit and also to provide the maximum cooling effect of the heat exchange surfaces in the film boiling range to avoid burnout. When it became apparent that once-through operation was possible in the relatively low ranges of mass flow it was recognized that such low mass flow conditions might advantageously be applied to once-through vapor generators utilized in combination with nuclear reactors, particularly of the pressurized water type. The primary coolant outlet temperatures from such reactors are relatively low, generally not exceeding 625° F. The coolant is pressurized to avoid boiling in the reactor and as a result it circulates from the reactor at high pressures, 2,000 to 2,500 p.s.i., but as already stated at rather low temperatures.

This type of vapor generator has a broad application in the heat exchanger field, however, it is particularly advantageous in nuclear reactor systems. One problem encounted in nuclear reactor systems, however, is the height of the units in the primary coolant system which must be enclosed within a containment vessel. Since containment systems are generally spherical or cylindrical with a dome shaped cover the linear height of the enclosed components has an exponential effect on the necessary containment volume and structure. Moreover, reactor systems utilizing heat exchangers usually employ a number of coolant loops and the height of the heat exchangers usually has a considerable effect on the amount of primary coolant piping used.

Originally once-through heat exchangers were of the shell and tube type employing straight tubes vertically extending between a pair of spaced tube sheets rigidly connected to the shell. Because of the length of the straight tubes the heat exchanger shell was of necessity relatively tall. To achieve a reduction in height U-tube heat exchangers were employed and while they cut down the height they introduced other problems in the numerous different sizes of U-bends which were required and in limitations on the arrangement of the heat exchanger internals.

It has been known that arranging U-bend tubes in an annular shaped bank has certain advantages, for example reduction in the different sizes of U-bends required, reduction in the overall height of the tube chamber, a preferable distribution of the inlet and outlet tubes in the tube sheet, more latitude in the interior arrangement of the tubes and accompanying structure, and under certain conditions a more desirable heat transfer arrangement. However, prior to the present time the problem of disposing an annular bank of U-bend tubes in an identically spaced pattern or lattice had not been solved. In the prior art where annular banks of U-bend tubes have been used the spacing has not been the same throughout the bank, for example in Patent No. 2,774,575 issued Dec. 18, 1956 to H. Walter the U-bend tubes are arranged in platens extending radially from the center of the heat exchanger vessel. While tubes in a single platen are evenly spaced apart the spacing between adjoining platens increases from the center to the radially outer region of the heat exchanger. When such diverging spacing is employed the effective heat transfer between the fluid flowing through the tubes and that flowing over them is considerably reduced.

It is a primary object of the present invention to achieve reduced heat exchanger height by incorporating an annular bank of equidistantly spaced U-bend tubes into a once-through vapor generator which utilizes relatively low mass flow on the shell side.

Another object is to provide a relatively compact nuclear reactor system arrangement which will afford a reduction in the piping required between the heat exchanger and the reactor.

A further primary object of the invention is to provide a once-through vapor generator in which a fluid is vaporized and superheated in the course of one continuous flow passage through the vapor generator.

An additional object is to provide a tube sheet of reduced thickness and having a symmetrical temperature distribution across its face.

Still another object of the invention is to superheat the vaporizable fluid making efficient use of the annular U-tube construction.

Accordingly, the present invention is directed to a once-through vapor generator comprising a vertically elongated pressure vessel containing an annular bank of equidistantly spaced U-bend tubes. The opposite ends of the U-bend tubes are connected into a tube sheet which transversely divides the pressure vessel into a vapor generating chamber and a second chamber which is subdivided into an inlet space and an outlet space for the tubes. Each of the U-bend tubes comprises a first section and a second section joined together by a U-bend section. The first sections of the tubes are located centrally within the vessel and the second sections are arranged in an annular ring concentrically around the first sections. Within the vapor generating chamber, at the inlet ends of the U-bend tubes, wall means enclose a portion of the tubes forming a separate passageway in which the vaporizable fluid is superheated.

In the vapor generator chamber all of the U-bend tubes are arranged in a equilateral triangular lattice so that each tube is spaced the same distance from its adjoining tubes.

In one embodiment of the invention the U-bend sections of the tubes are located in the upper end of the vapor generating chamber so that the tube bank is drainable. In this embodiment the feedwater is heated to saturation temperature by condensing vapor within the unit before it is discharged into the vapor generating chamber. In the other embodiments the U-bend sections are located in the lower end of the vapor generator and as a result the tubes are nondrainable. In these embodiments, however, the feedwater does need not be heated to saturation temperature because it enters the vapor generating chamber at the end opposite the tube sheet and as consequence danger of thermal shock to the thick tube sheet is not a factor.

The various features of novelty which characterize the invention are pointed out with particularity in the claims annexed to and forming a part of this specification. For an understanding of the invention, its operating advantages and specific objects attained by its use, reference should be had to the accompanying drawing and descriptive matter in which there is illustrated and described a preferred embodiment of the invention.

Of the drawings:

FIG. 3A and 3B show alternate arrangements of the superheater passageway shown in FIG. 3;

FIG. 3C is an enlarged partial detail of the outlet from the superheater passageway in FIGURE 3.

In the drawings similar elements are designated by the same base reference numeral with a different prefix number to distinguish the several embodiments.

Once-through vapor generators for the purpose of this invention are units in which at least a portion of the feedwater is vaporized and superheated in one continuous flow path in contact with the heating surfaces in a vapor generator. This includes vapor generators in which a portion of the vaporized feed is mixed with the incoming feed to bring it to a desired inlet temperature.

For more complete explanation of the utilization of low mass flows in once-through vapor generators reference is made to the copending application Ser. No. 426,035, filed Jan. 18, 1965, and now Patent No. 3,385,268, in the name of Theodore S. Sprague, one of the coinventors in the present application, and assigned to the common assignee.

Figure 1:
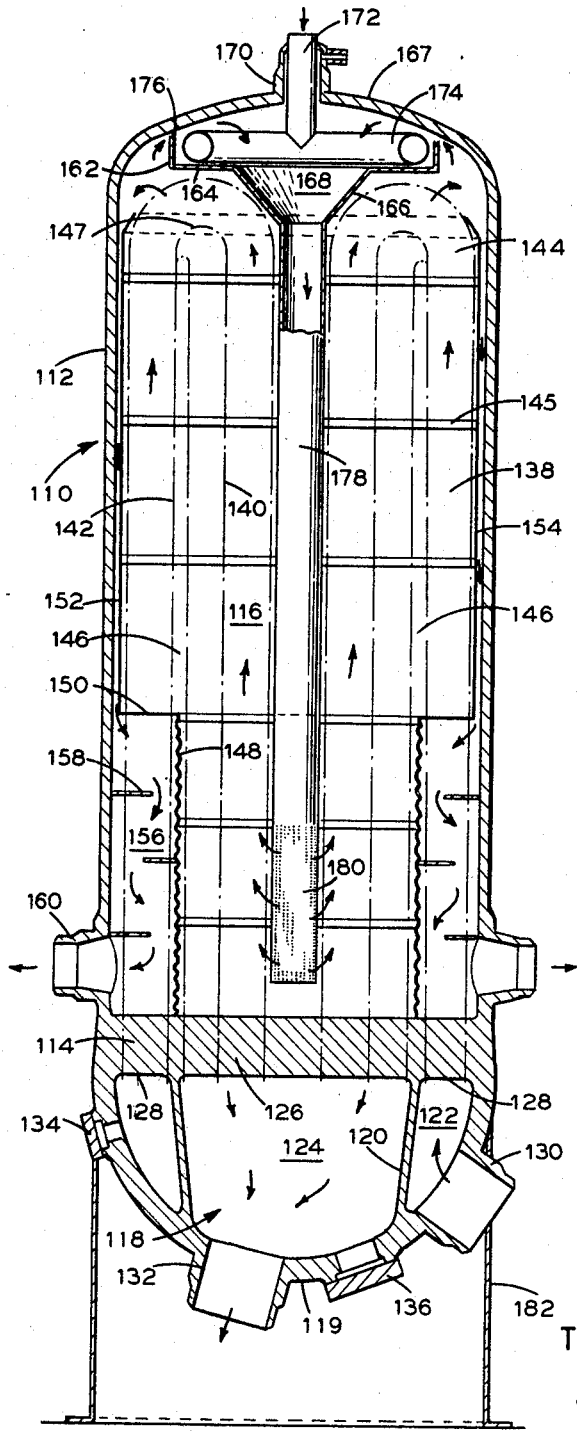
FIG. 1 is a vertical section through a once-through vapor generator illustrating one embodiment of the present invention.

In FIGURE 1 a once-through vapor generator 110 is shown comprising a vertically elongated pressure vessel 112 divided interiorly by a transversely arranged tube sheet 114 into a first or vapor generating chamber 116 and a second chamber 118 located between the tube sheet 114 and the lower end 119 of the pressure vessel. In the second chamber 118 an upright wall member 120 is attached to and extends between the tube sheet 114 and the lower end 119 of the vessel dividing the second chamber into an annular inlet space 122 and a central outlet space 124. The wall member 120 provides support for the tube sheet 114 from lower end 119 and divides it into a centrally disposed circular part 126 and a concentrically arranged annular outer part 128. Nozzle 130 opens in to inlet space 122 and nozzle 132 forms a opening from outlet space 124. Plates 134 and 136 afford closures for access openings into the inlet space 122 and the outlet space 124 respectively.

In the vapor generating chamber 116 an annular bank of U-bend tubes 138 is connected to the tube sheet 114 with the U-bend or bight sections located in the upper end of the chamber. Each U-bend tube is divided into a first section 140 connected to the inner part 126 of the tube sheet and a second section 142 connected to the outer part 128 and the tube sheet. At the upper end of the chamber the U-bend section 144 connects the first and second sections together. The first and the second sections of the U-bend tubes have the same spacing between adjacent tube sections throughout the entire bank of tubes. To provide identical spacing the tubes are arranged in similar triangular lattices in the first and second sections. For a complete description of this novel tube arrangement reference is made to U.S. application Ser. No. 482,243, filed Aug. 24, 1965, for a Heat Exchanger U-bend Tube Arrangement in the name of J. H. Ammon one of the coinventors in the present case and assigned to the common assignee. Tube support means 145 are transversely arranged within the tube bank at vertically spaced positions to properly position and restrain the U-bend tubes.

In annular space 146 between the first and second sections 140 and 142 of the tubes is a corrugated cylindrically shaped wall 148 attached at its lower end to the tube sheet 114. Attached to the upper end of the wall 148 is an annular shaped end plate 150 which extends radially outward toward but closely spaced from the adjoining pressure vessel wall. Connected to and extending upwardly from the outer edge of the end plate 150 within the space between the periphery of the bank of tubes 138 and the adjacent wall of pressure vessel 112 is a circular wall member 152 which cooperates with the vessel wall to form passageway 154. This passageway is open at its upper end to the vapor generating chamber 116 and at its lower end to superheater passageway 156. The annular passageway 156 is formed laterally by the corrugated baffle 148 and the opposed wall of the pressure vessel 112 and at its lower and upper ends by the tube sheet 114 and the end plate 150 respectively. The second sections 142 of the tubes are rolled into the end plate 150 forming a seal against the passage of fluid from within the vapor generating chamber 116 into the superheater passageway 156. In the superheater passageway 156 a number of annular transversely arranged baffles 158 are disposed in vertically spaced positions and connected alternatively to the wall of pressure vessel 112 and to the corrugated baffle 148. An outlet opening 160 is located at the lower end of the superheater passageway.

In the upper end of the vapor generating chamber 116 serially connected walls 162, 164, 166 in combination with the upper end closure 167 of the pressure vessel 112 form feedwater inlet chamber 168. Extending through nozzle 170 on the top of the vessel is feedwater inlet pipe 172 connected within chamber 168 to feedwater distributor pipe 174. The distributor pipe 174 is perforated for spraying feedwater into the chamber 168. At the junction of wall 162 and the pressure vessel a number of openings 176 are provided communicating between vapor generating chamber 116 and the feedwater inlet chamber 168. Pipe 178 extends downwardly from the lower end of wall 166 and has a perforated lower end 180 for delivering the feedwater into the bottom of the vapor generating chamber.

The vapor generator 110 is supported by a skirt 182 which extends downwardly from the lower end of the vessel.

Figure 2:
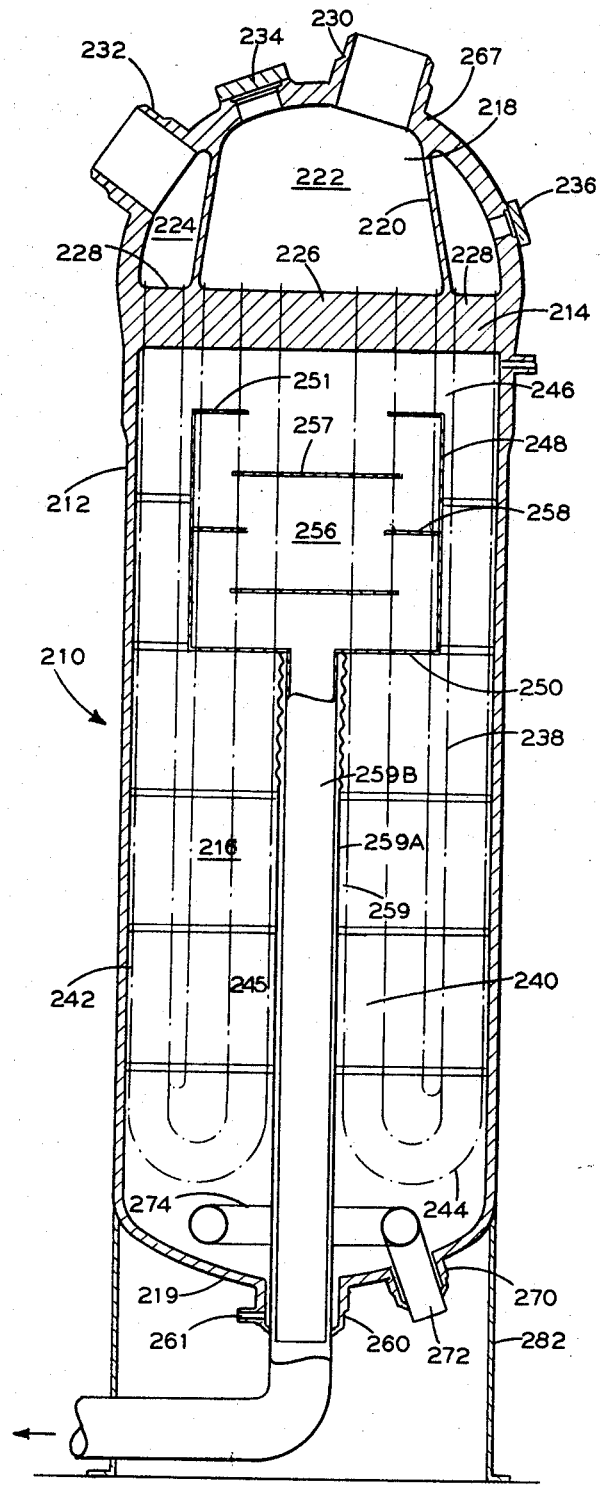
FIG. 2 is a vertical section through a once-through vapor generator disclosing another embodiment of the present invention.

In FIGURE 2 another variant of once-through vapor generator 210 is shown comprising a vertically elongated pressure vessel 212 divided by a transversely arranged tube sheet 214 located in the upper end of the vessel into a first or lower vapor generating chamber 216 and an upper second chamber 218. The second chamber 218 is divided by an upright wall partition member 220 extending between the tube sheet and the upper end closure 267 of the vessel into a centrally located inlet space 222 and a circumscribing annular outlet space 224. Further, the wall partition member 220 provides support for the tube sheet 214 from end closure 267 and divides it into a centrally disposed circular part 226 and a concentrically arranged outer part 228. Nozzle 230 opens into the inlet space 222 while nozzle 232 forms an opening from the outlet space 224. Plates 234 and 236 form closures for the access openings to inlet space 222 and outlet space 224 respectively.

In the vapor generating chamber 216 the depending legs on annular bank of U-bend tubes 238 are connected to the tube sheet 214 with the U-bend or bight sections of the tubes located in the lower end of the chamber. An open space is provided through the center of the bank of tubes. Each U-bend tube is divided into a first section 240 connected to the inner part 226 of the tube sheet and a second section 242 connected to the outer part 228 of the tube sheet 214. At the lower end of the chamber U-bend sections 244 connect the first and second sections together. The U-bend tubes are equally spaced from one another in the same manner as described earlier for the unit shown in FIG. 1.

In the upper end of the vapor generating chamber 216 spaced below the tube sheet is an vertical cylindrical plate member 248 disposed in the annular space 246 between the first and second sections of the tubes. Transversely arranged across the lower end of the plate member 248 is wall 250 while projecting inwardly from its upper end is a ring-shaped member 251. The plate member or wall 248 combines with the transverse plates 250, 251 to form a separate superheater passageway 256 within the vapor generating chamber 216. In the passageway 256 disk baffles 257 and ring-shaped baffles 258 alternate with one another. The first sections of the U-bend tubes pass through the plate 250, through the baffles 257 and 258 and from thence through plate 251 on their way to tube sheet 214. Connected to the plate member 250 is superheater outlet pipe assembly 259 comprising an outer conduit 259A and an inner thermal sleeve 259B which passes downwardly through nozzle 260 in the lower end or head 219 of the pressure vessel 212. At their upper extremities the outer conduit 259A and inner tubular sleeve 259B are attached to the wall 250, a portion of conduit 259A being corrugated to accommodate differential expansion due to temperature differences in the conduit and the bank of U-bend tubes 238. At their lower ends the conduit is connected to the lower head 219 while the sleeve 259B is free to move, thereby accommodating differential thermal expansion of the sleeve with respect to the encircling conduit and the tube bank. The space between the conduit 259A and the sleeve 259B provides an insulating barrier against loss of heat from the fluid within the sleeve to the fluid in the vapor generating chamber. Extending through nozzle 270 in the lower end 219 of the vessel is feedwater inlet pipe 272 which is connected to ring-shaped feedwater distributor pipe 274. The pipe 274 is perforated for distributing feedwater into the lower end of the pressure vessel.

Extending downwardly from the exterior of the lower end 219 of the pressure vessel is a cylindrically shaped skirt 282 which supports the vapor generator 210.

Figure 3:
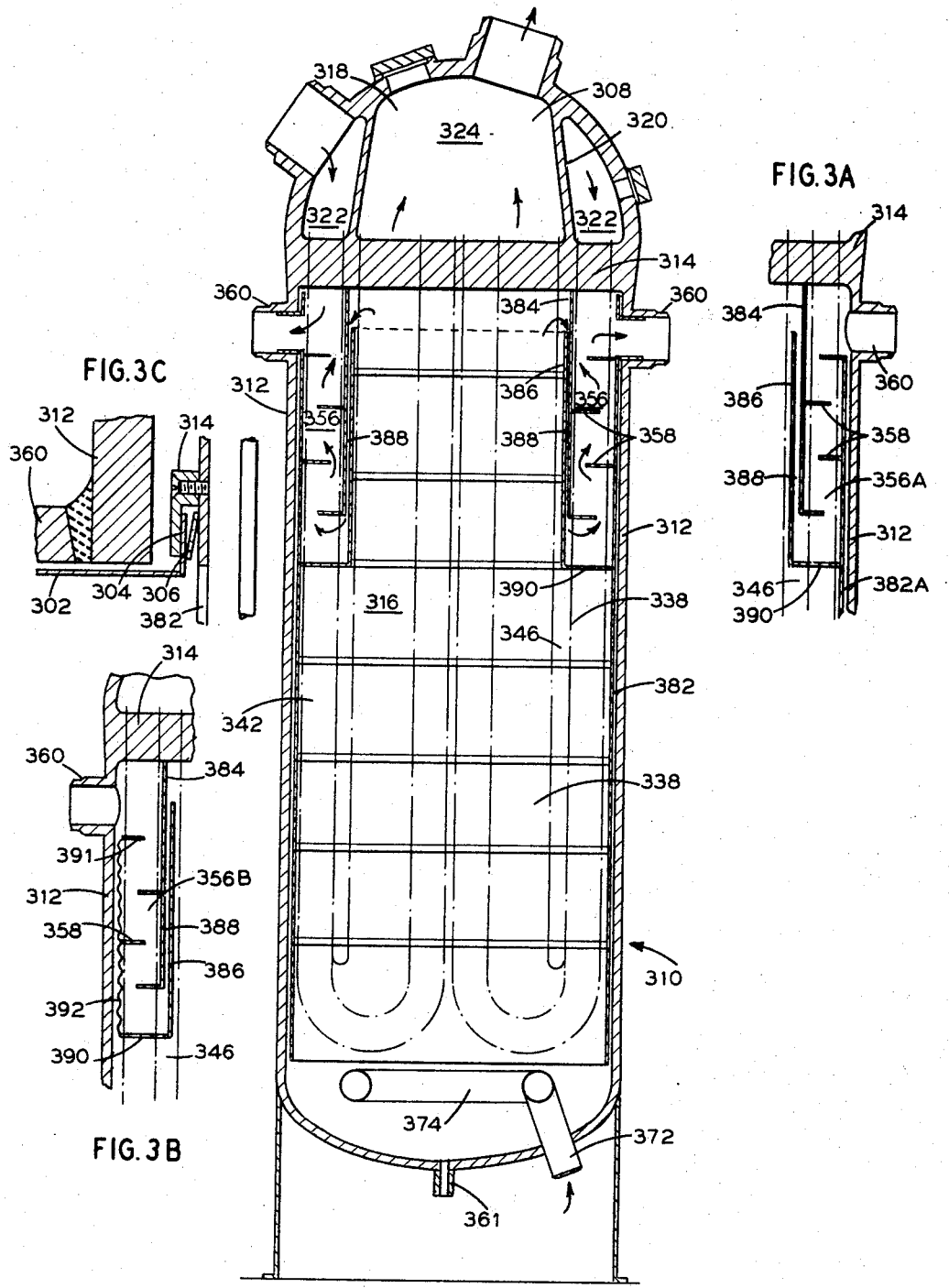
FIG. 3 is a vertical section through a once-through vapor generator illustrating a third embodiment of the present invention.

FIGURE 3 shows a vapor generator 310 similar in construction to the unit illustrated in FIGURE 2, however, the second chamber 318 is divided by the wall member 320 into an inner outlet space 324 and an outer concentrically arranged annular inlet space 322. The annular bank of U-bend tubes 338 unlike the one in FIGURE 2 does not have an open space in its center, rather the tubes fill substantially the entire transverse section of the vapor generating chamber 316.

In FIGURES 3, 3A, and 3B are shown three different arrangements of a superheater passageway 356, 356A, and 356B respectively for the vapor generator 310. In FIGURES 3 and 3A a shroud member 382, 382A respectively encircles the tube bank closely spaced from the pressure vessel wall 312. In FIGURE 3 the shroud 382 extends from the lower end of the tube bundle up to but is not connected to the tube sheet 314, while in FIGURE 3A the shroud 382A terminates at its upper end below the superheater outlet 360 from the superheater passageway 356A. Situated in space 346 between the first and second sections of the U-bend tubes in each of the superheater passageway embodiments is a pair of spaced cylindrically shaped walls 384 and 386. Wall 384 is attached at its upper end to the tube sheet 314 while wall 386 is spaced vertically below the tube sheet and extends downwardly to a point below the lower end of the wall 384. These two walls are closely spaced apart forming an annular inlet passageway 388 into the superheater passageways 356, 356A and 356B. At the lower end of the wall 386 a transverse ring-shaped member 390 forms the bottom closure for the superheated passageway.

The significant difference between the superheater passageway shown in FIGURES 3 and 3A is the arrangement of the upper end of the shroud members 382, 382A adjacent the superheater outlet nozzles 360.

In FIGURE 3B corrugated plate baffle 392, closely spaced from the pressure vessel wall 312, serves as a shroud member adjacent the superheater passageway 356B. The upper end is secured to angle member 391 which is attached to the vessel wall just beneath the superheater outlet nozzles 360. The lower end of baffle 392 connects to a transverse ring-shaped member 390 which forms the bottom closure for super-heater passageway 356B. The remainder of the structure is similar to the superheating passageway shown in FIGURE 3 and 3A. Within each of these superheating passageways there are a number of suitably spaced ring-shaped baffles 358 extending alternately inwardly from the shroud 382 and 382A or the corrugated baffle 392 and outwardly from the wall 384 for providing a serpentine flow path through the passageway. The second sections 342 of the U-bend tubes are rolled into the end plate 390 to prevent leakage from the vapor generating chamber into the superheating passageway.

In FIGURE 3C there is an enlarged detail of the seal utilized at the outlet from the superheater passageway 356 of FIGURE 3. A cylindrically shaped thermal sleeve 302 extends from within the superheater outlet nozzle 360 into the pressure vessel 312 and at its inner end has attached thereto a perpendicularly disposed upwardly extending ring-shaped plate 304. Coextensive with a portion of the plate 304 and closely adjacent thereto is an angle shaped member 314 connected to the shroud 382. These elements cooperate to form a seal for the thermal sleeve utilizing a suitably attached spring washer 306, which at its radially outer edge bears against the plate 304 and about its radially inner edge bears against the shroud 382.

In FIGURES 2 and 3 drain nozzle 261 and 361 respectively is provided at the lower end of the vessel for draining the fluid on the shell side of the vessel.

Figure 4:
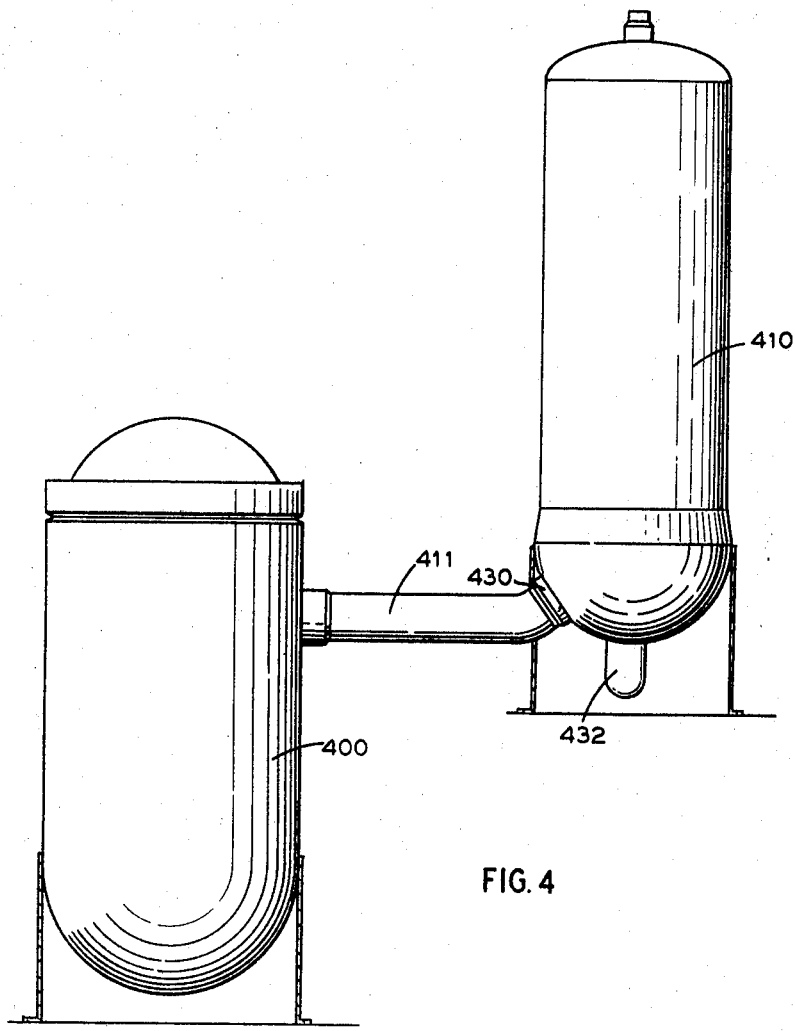
FIG. 4 is an elevation view showing a general arrangement of a reactor and a once-through vapor generator of the type disclosed in FIG. 1.

FIGURE 4 shows a general overall arrangement of a reactor 400 and a once-through vapor generator 410 similar to the one illustrated in FIGURE 1. The primary coolant from the reactor flows through pipe 411 to the inlet nozzle 430 of the vapor generator and thence through the U-bend tubes and then passes through the pipe 432 to a pump (not shown) for recirculation through the reactor. It can be appreciated from FIGURE 4 that a reduction in the height of the vapor generator 410 considerably reduces the overall height of the reactor plant and as a result a much smaller containment can be employed. Further if a straight tube vapor generator was used with the primary coolant entering one end of the vapor generator and exiting from the opposite end the piping connecting the vapor generator and the reactor would be considerably greater in length. Accordingly, by employing a U-bend tube construction considerable savings can be made in the piping requirements.

In FIGURE 1 arrows indicate the paths of flow through the vapor generator of the heating fluid, the primary coolant from the reactor, and of the vaporizable fluid. The primary coolant from the reactor is introduced into the vapor generator 110 through nozzle 130, flows into inlet space 122 and then flows serially within the tubes through the second sections 142, the U-bend sections 144 and then the first sections 140 of the bank 138 of U-bend tubes, discharging into the outlet space 124. Feedwater is fed into the feedwater inlet chamber 168 from the distribution pipe 174. A quantity of vapor as it is generated is withdrawn from the vapor generating chamber 116 through the openings 176 in wall 162 into the chamber 168 where it condenses and mixes with the incoming feedwater and raises the feedwater to substantially saturation temperature. The feedwater along with the condensed vapor passes downwardly through pipe 178 and is distributed into the lower end of the vapor generating chamber through the perforated pipe end 180. Since the feedwater entering the lower end of the chamber is substantially at saturation temperature vapor generation commences as the fluid surrounding the tubes begins to absorb heat by indirect heat transfer from the heating fluid flowing within the U-bend tubes. After flowing upwardly through the flow path adjacent the corrugated baffle 148 the cross sectional fluid flow area for the vaporizable fluid in the vapor generating chamber is substantially doubled, thereby reducing to about a half the fluid mass flow through the remainder of the vapor generating chamber. In its upward path through the vapor generating chamber 116 the vaporizable fluid which initially is 100% water is evaporated to dryness, i.e., saturated steam. At the upper end of the vapor generating chamber 116 a quantity of the saturated vapor is drawn off into the feedwater inlet chamber 168, as already mentioned, and the remainder flows downwardly through the passageway 154 between the cylindrical wall 152 and the wall of pressure vessel 112. From this relatively narrow passageway 154 the steam flows into the superheater passageway 156 and courses in a serpentine path over the relatively hotter inlet ends of the second section 142 of the U-tubes and is superheated prior to discharge through the outlet nozzle opening 160 and from thence to a point of use.

In FIGURES 2 and 3 the position of the bank of U-bend tubes is reversed as compared to FIGURE 1, i.e., the U-bend tubes are depending from the tube sheet in the upper end of the vessel and with this arrangement the feedwater inlet is located at the lower end of the vessel. In the vapor generator of FIGURE 1 the feedwater was heated to substantially saturation temperature to avoid the danger of thermal shock to the thick tube sheet, which is adjacent the outlet end of the feedwater pipe 178. However, in FIGURES 2 and 3 the feedwater inlet is at the opposite end of the vapor generator from the tube sheet and it is not necessary to pre-heat the feedwater to saturation temperature to avoid thermal shock of the tube sheet.

In FIGURE 2 the primary coolant inlet is in inner space 222 of the second chamber 218 while in FIGURE 3 it is in the annular outer space 322. In each instance the superheater is positioned so the steam will be in indirect heat transfer relationship with the hottest primary coolant, i.e., at the inlet ends of the tubes. FIGURE 2 shows the feedwater entering the lower end of the vessel through pipe 272 and distributor 274 and then flowing upwardly over the tubes which comprise annular bank 238 to the opposite end of the lower vapor generating chamber 216 where it flows inwardly over plate 251 and then downwardly into the superheater passageway 256. The vaporizable fluid after being superheated flows through the outlet pipe 259 to the lower end of the vessel and then out to a point of use.

In FIGURE 3 the vaporizable fluid, introduced into the vapor generator via inlet pipe 372 and distributor 374 flows upwardly through the chamber 316, having a lower vaporizable fluid mass flow in the lower half which becomes approximately doubled as it flows within the confines of annular wall 386. At the top of the chamber vaporizable fluid which has been heated to saturation temperature and substantially 100% quality reverses direction and flows downwardly through the passageway 388 entering the lower end of the superheater passageway 356 from whence it flows upwardly in a serpentine course over the inlet ends of the U-bend tubes and is superheated prior to exiting through the outlet nozzle 360 to a point of use.

The present invention provides a once-through vapor generator construction particularly adapted for but not limited to use in reactor systems requiring relatively low headroom, and one in which especially efficient heat transfer is achieved by maintaining nucleate boiling throughout substantially all of the vapor generating surface.

By arranging the U-bend tubes attached to the tube sheet in an annular bank a symmetrical temperature distribution is developed in the tube sheet. Depending on the location of the primary fluid inlet to the tubes the higher temperature heating fluid may enter either the tubes of centrally disposed inner or concentrically disposed outer portions of the tube bank. In any event, the temperature distribution will be symmetrical causing less thermal stress distortion in the tube sheet than in the conventional U-bend tube construction which has the inlet in two adjacent quadrants and the outlet in the other two quadrants.

By employing the novel equidistantly spaced U-bend tube construction, optimum utilization is made of the space within the vapor generator providing a compact construction as well as an improved heat exchanger arrangement as compared with the known annular U-tube arrangements in which the spacing between adjacent tubes varies.

The wall members 120, 220, and 320 which divides the space between the tube sheet and vessel end into an inlet and outlet space also supports the tube sheet and very appreciably reduces its thickness because of its staying qualities.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:
1. A once-through vapor generator comprising:
  (A) an elongated pressure vessel,
  (B) a tube sheet transversely arranged within and dividing said pressure vessel into a first chamber and a second chamber,
  (C) means for dividing said second chamber into an inlet space and an outlet space,
  (D) an annular bank of U-bend tubes disposed within said first chamber with the ends of said tubes connected to said tube sheet and each of the tubes having one end communicating with the inlet space and the other end with the outlet space in said second chamber, each tube having a first section and a second section joined by a U-bend portion, the first tube sections being located centrally within the annular bank and the second tube sections being arranged concentrically about the first tube sections, adjacent tube sections being spaced substantially the same distance apart,
  (E) means for delivering a heating fluid to said inlet space and for removing the heating fluid from said outlet space after its passage through said bank of U-bend tubes,
  (F) means for supplying a vaporizable fluid to said first chamber for flow over said bank of tubes,
  (G) means in said first chamber enclosing a portion of said tubes and forming a separate passageway for the flow of said vaporizable fluid therethrough whereby said vaporizable fluid is superheated therein terminating one continuous flow path through said first chamber, and
  (H) outlet means for said vaporizable fluid from said first chamber.

2. A once-through vapor generator as set forth in claim 1 wherein said means forming a separate superheater passageway is located near one end of said first chamber and encloses at least a portion of the end sections of said U-bend tubes receiving the heating fluid from said inlet space.

3. A once-through vapor generator as set forth in claim 2 wherein said tube sheet is located near one end of said pressure vessel and forms therewith said second chamber, and a generally cylindrically shaped baffle situated within said second chamber extending between the end of said pressure vessel and the juxtaposed face of said tube sheet dividing said second chamber into a centrally located first space and an annular second space concentrically arranged about said first space.

4. A once-through vapor generator as set forth in claim 3 wherein said first sections of said U-bend tubes communicate with said first space and second sections communicate with the second space in said second chamber.

5. A once-through vapor generator as set forth in claim 1 wherein said pressure vessel is positioned vertically, said tube sheet is located at the lower end of said vessel, and said bank of U-bend tubes extends upwardly from said tube sheet with said U-bend portions located in the upper end of said first chamber whereby said bank of tubes is drainable.

6. A once-through vapor generator as set forth in claim 5 wherein said second space in said second chamber forms the inlet space to said bank of tubes and said first space forms the outlet space.

7. A once-through vapor generator as set forth in claim 6 wherein said annular bank of tubes is arranged to provide an open space through the center of said bank.

8. A once-through vapor generator as set forth in claim 7 wherein annular shaped walls depending downwardly from the upper end of said pressure vessel form in combination with the upper end of said vessel a feed-water inlet chamber, and openings formed through said annular walls afford communication between said first chamber and said feedwater chamber.

9. A once-through vapor generator as set forth in claim 8 wherein a feedwater inlet pipe extends through said vessel into said feedwater chamber, a perforated feed pipe connected to the chamber end of said feedwater inlet pipe delivers feedwater into said chamber, and a feedwater pipe extends downwardly through the open spaces in the center of said bank of tubes from said chamber to closely above said tube sheet for supplying feedwater into said first chamber.

10. A once-through vapor generator as set forth in claim 9 wherein the lower end of said feedwater pipe is perforated to distribute the feedwater evenly into said tube bank.

11. A once-through vapor generator as set forth in claim 1 wherein a cylindrical baffle located between said first sections and said second sections of said annular bank of tubes is attached to and extends upwardly from said tube sheet for a portion of the height of said bank, an annular shaped end plate transversely arranged within said chamber is attached at its inner end to said baffle and extends radially outward therefrom to a point located outwardly from said second sections of said bank of tubes and closely spaced from the wall of said pressure vessel, said baffle, the opposed wall of said pressure vessel and said end plate forming the separate superheater passageway within said first chamber.

12. A once-through vapor generator as set forth in claim 11 wherein a vertically arranged cylindrically shaped wall is located between said pressure vessel wall and the outer periphery of said bank of tubes and is attached to and extends upwardly from the outer edge of said end plate to near the upper end of said bank of tubes forming in combination with said pressure vessel wall a passageway for flowing said vaporizable fluid from the upper end of said first chamber into said separate superheater passageway.

13. A once-through vapor generator as set forth in claim 12 wherein a plurality of spaced transversely arranged ring shaped baffles are positioned within said separate superheater passageway for imparting a serpentine flow path to the vaporizable fluid flowing therethrough.

14. A once-through vapor generator as set forth in claim 13 wherein at least one vaporizable fluid outlet from said separate superheater passageway is located through said pressure vessel wall.

15. A once-through vapor generator as set forth in claim 1 wherein said pressure vessel is positioned vertically, said tube sheet is located at the upper end of said vessel, and said bank of U-shaped tubes extends downwardly from said tube sheet with said U-bend portions located in the lower end of said first chamber.

16. A once-through vapor generator as set forth in claim 15 wherein a feedwater inlet distribution pipe is located in the lower end of said first chamber for supplying vaporizable fluid thereto for flow over said bank of tubes.

17. A once-through vapor generator as set forth in claim 16 wherein a first cylindrical wall attached at its upper end to said tube sheet and positioned between said first sections and said second sections of said U-bend tubes extends downwardly into said first chamber, a second vertically arranged cylindrical wall spaced from said tube sheet and closely spaced inwardly from said first cylindrical wall in the space between said first and second sections of said U-bend tubes extends downwardly below the lower end of said first wall and forms therewith a passageway, plate means in combination with said first and second walls enclosing a portion of said second sections and forming said separate superheater passageway within said first chamber.

18. A once-through vapor generator as set forth in claim 17 wherein said second space in said second chamber forms the inlet space to said bank of tubes and said first space forms the outlet space.

19. A once-through vapor generator as set forth in claim 18 wherein said plate means comprise a cylindrically shaped shroud disposed within said first chamber encircling said bank of tubes and located at its upper end next to said tube sheet and extending downwardly to near the bottom of said first chamber, said shroud and the juxtaposed said pressure vessel wall forming therebetween a narrow annular space, and a transversely arranged ring shaped end plate connected around its inner edge to said second wall and around its outer edge to said shroud thereby forming a closure for the lower end of said separate superheater passageway, and a plurality of ring shaped baffles disposed within said passageway for imparting a serpentine flow path to the vaporizable fluid flowing therethrough.

20. A once-through vapor generator as set forth in claim 18 wherein at least one outlet from said separate superheater passageway extends through said pressure vessel wall, and said plate means comprise a cylindrically shaped shroud disposed within said first chamber encircling said bank of tubes and extending downwardly from a transverse plane immediately below said outlet from said passageway to below the lower end of said second wall, and a transversely arranged ring shaped end plate connected around its inner edge to said second wall and around its outer edge to said shroud thereby forming a closure for the lower end of said separate superheater passageway, and a plurality of ring shaped baffles disposed within said passageway for imparting a serpentine flow path to the vaporizable fluid flowing therethrough.

21. A once-through vapor generator as set forth in claim 18 wherein at least one outlet from said separate superheater passageway extends through said pressure vessel wall, a ring shaped angle member attached to the wall of said pressure vessel immediately below said outlet extends around the inner circumference of said vessel, a vertically disposed cylindrically shaped corrugated baffle encircling said bank of tubes and attached at its upper end to said angle and extending downwardly to a transverse plane which intersects the lower end of said second wall, a transversely positioned end plate connected to and extending between said baffle and said second wall forming a closure for the lower end of said superheater passageway, and a plurality of ring shaped baffles within said passageway for imparting a serpentine flow path to the vaporizable fluid flowing therethrough.

22. A once-through vapor generator as set forth in claim 16 wherein said first space in second chamber forms the inlet space to said bank of tubes and said second space forms the outlet space.

23. A once-through vapor generator as set forth in claim 22 wherein said bank of U-shaped tubes are arranged to provide a central open space extending vertically through said bank.

24. A once-through vapor generator as set forth in claim 23 wherein said separate superheater passageway comprises a vertically arranged cylindrical wall positioned in the upper end of said first chamber and located in the annular space in said bank of U-shaped tubes between said first sections and said second sections, a ring-shaped plate connected to the upper end of said cylindrical wall and extending transversely inward forming a partial cover for said cylindrical wall, a plate connected to and closing the lower end of said cylindrical wall, a superheated vaporizable fluid outlet pipe connected to said plate and extending vertically downwardly through the open space in said bank of tubes and through said pressure vessel wall, and baffle means located within said cylindrical wall for imparting a serpentine flow path to the vaporizable fluid coursing therethrough.

25. A once-through vapor generator as set forth in claim 24 wherein a portion of said superheated vaporizable fluid outlet pipe is corrugated to compensate for differential expansion within said pressure vessel.

References Cited

UNITED STATES PATENTS

| 2,922,404 | 1/1960 | Kopp et al. | 122—34 |
| 3,147,743 | 9/1964 | Romanos | 122—32 |
| 3,298,358 | 1/1967 | Alden | 122—34 |

FOREIGN PATENTS

| 992,298 | 5/1965 | Great Britain. |

CHARLES J. MYHRE, *Primary Examiner.*